United States Patent [19]

Walker et al.

[11] 4,270,078
[45] May 26, 1981

[54] METHOD AND APPARATUS FOR A VARIABLE FREQUENCY INVERTER SYSTEM HAVING COMMUTATION FAULT DETECTION AND CORRECTION CAPABILITIES

[75] Inventors: Loren H. Walker, Salem; John H. Cutler, Roanoke, both of Va.

[73] Assignee: General Electric Company, Salem, Va.

[21] Appl. No.: 32,761

[22] Filed: Apr. 24, 1979

[51] Int. Cl.³ .............................................. H02P 7/42
[52] U.S. Cl. ..................................... 318/803; 363/37; 363/58; 363/79; 363/96
[58] Field of Search ................... 318/802, 803; 363/37, 363/55–58, 79, 81, 87, 96

[56] References Cited

U.S. PATENT DOCUMENTS 4,066,938  1/1978  Turnbull .............................. 318/803
4,183,081  1/1980  Cutler et al. ....................... 363/58 X Primary Examiner—William M. Shoop
Attorney, Agent, or Firm—Arnold E. Renner

[57] ABSTRACT

An inverter system including a controlled direct current (d.c.) power source for providing a variable d.c. voltage to a variable output frequency inverter circuit by way of a suitable d.c. link, includes suitable circuitry for detecting a commutation fault or shoot-through condition within the inverter circuit and for taking appropriate remedial action to correct such condition. The shoot-through condition is determined as a function of the d.c. input current to the inverter circuit, the output alternating current (a.c.) of the inverter circuit and the extant condition of the load. In the particular embodiment of the invention illustrated, the load is an a.c. motor and the load condition sensed is whether the motor is in the running or idle mode of operation.

14 Claims, 3 Drawing Figures

METHOD AND APPARATUS FOR A VARIABLE FREQUENCY INVERTER SYSTEM HAVING COMMUTATION FAULT DETECTION AND CORRECTION CAPABILITIES

BACKGROUND OF THE INVENTION

The present invention relates generally to inverter systems and more particularly to an inverter system for supplying electrical power to a motor, which system includes novel circuitry for the detection and correction of commutation faults, often and more popularly called "shoot-throughs".

The variable power conversion unit currently most popular, whether direct current (d.c.) to alternating current (a.c.) or a.c. to d.c., employs a bridge arrangement of controlled rectifiers. Today's most commonly used controlled rectifier is of the semiconductor type, generically known as the thyristor, the most common form of which is the silicon controlled rectifier (SCR). In the remaining portion of this specification, the word "thyristor" will be used in that generic sense and it is understood that this term is used to designate controlled rectifiers generally. The three phase version of the power conversion unit normally includes six thyristors in the customary bridge arrangement such that there are two series connected thyristors in each of three legs. These thyristors are normally rendered conductive in a prescribed sequence to control power from the source to the load. There are, however, occasions where one or more of the thyristors will fail to commutate or turn off at the proper time, thus resulting in an improper conductive situation. Viewed from the d.c. side of the bridge, when a thyristor fails to commutate there exists a direct short circuit across the d.c. buses because both thyristors of a leg are in the conductive condition. This is known as a commutation fault or more commonly, a shoot-through.

There are many causes of shoot-throughs but, regardless of origin, the ultimate cause is the failure of the thyristor current to reduce to a value where the thyristor will cease to conduct. The effective of the shoot-through on system performance varies with the type of inverter used. In the case of a voltage source inverter, a shoot-through generally requires the inverter to be shut down. In a current source inverter, so long as the shoot-through is of short duration, there is usually no adverse effect on either the thyristor or the overall control of the power supplied to the load. The majority if not most systems, therefore, include some form of shoot-through protection to detect and take corrective action when a shoot-through is imminent or has already occurred. This protective action can and does take on a variety of forms, the ultimate purpose of all being to reduce the thyristor current to a point where the thyristor will cease to conduct. The form of the particular system is often governed to a large degree by the nature of the conversion bridge and its control as well as, or in addition to, the nature of the load itself. Many such protection schemes are very complex and hence expensive. This is particularly true in very closely or precisely controlled systems which employ anticipatory schemes in an attempt to detect an incipient shoot-through and take preventive action with respect thereto before the shoot-through actually occurs. In other applications, however, the expense of such a scheme is not warranted since the existence of a shoot-through, so long as it is not allowed to continue, does not seriously affect the overall system performance. As an example, in extremely large motor drives where the inertia of the system inherently makes the response time of the system relatively slow, transient shoot-throughs which are corrected within a portion of a cycle do not seriously or adversely affect overall system performance.

SUMMARY OF THE INVENTION

It is, therefore, an object of the present invention to provide an improved method and apparatus, for a variable frequency inverter system, having commutation fault detection and correction capabilities.

It is another object to provide an improved method and apparatus for the detection and correction of shoot-throughs in an inverter system.

A further object is to provide a method and apparatus for the detection and correction of commutation faults or shoot-throughs for use with a controlled current inverter drive for an a.c. motor.

Another object is to provide a method and apparatus for the detection and correction of shoot-throughs for use with controlled current inverter drives for an a.c. motor, which detection and correction scheme functions through the sensing of the easily obtained system operational parameters.

Briefly, the foregoing and other objects are achieved in accordance with the present invention by providing an inverter system which includes a controlled d.c. power source to provide a variable d.c. current to a variable output frequency inverter circuit by way of a suitable d.c. link. The system further includes circuitry for the detection of a commutation fault or shoot-through within the inverter circuit and for taking appropriate remedial action to correct such a condition. The circuitry and method employed first determines the value for the d.c. current within the connecting link and the value of the output current of the inverter circuit to provide two current feedback signals. Then, depending upon the instantaneous condition of the load, one of two reference signals is selected to be combined with the two current feedback signals. When these three signals enjoy a particular or predetermined relationship the resultant output is such that it effects a reduction in the output of the d.c. source to hence reduce the current supplied to the inverter.

BRIEF DESCRIPTION OF THE DRAWING

While the present invention is particularly defined in the claims annexed to and forming a part of this specification, a better understanding can be had from the following description taken in conjunction with the accompanying drawings in which:

DETAILED DESCRIPTION

Figure 1:
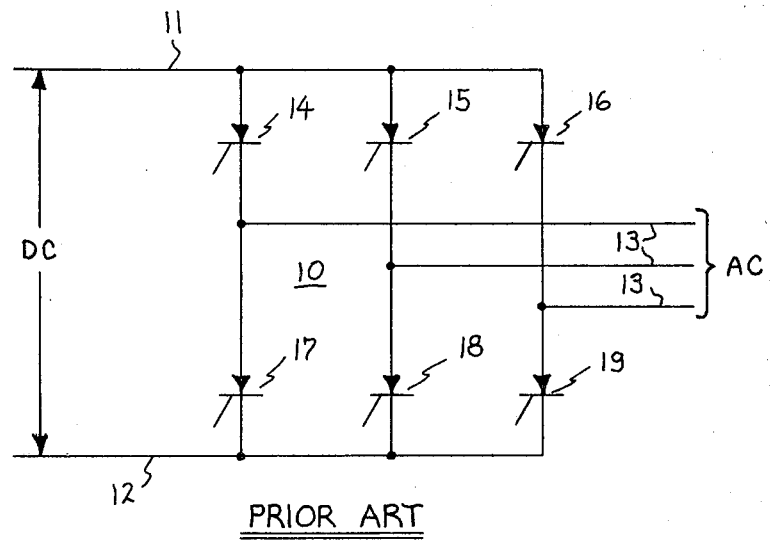
FIG. 1 is a schematic diagram illustrating the basic component of an electrical power conversion system employing semiconductor controlled rectifiers or thyristors as is well known in the art.

Prior to beginning an actual description of the present invention, it is believed appropriate to provide a brief discussion of the prior art structures which can find use in the present invention. Referencing first FIG. 1, there is shown the basic form of the three phase/d.c. power conversion unit 10. The unit 10 includes d.c. buses 11 and 12 across which the d.c. voltage either appears or is presented. Similarly, a.c. buses 13 present or receive a.c. power all in accordance with the direction of conversion. The fundamental conversion unit is comprised of six thyristors 14 through 19 which are arranged in a bridge arrangement. As is well known, if d.c. is applied to the buses 11 and 12, the appropriate firing or rendering conductive of the thyristors of the bridge will cause an a.c. voltage to be presented on the buses 13. Conversely, if a.c. is presented on buses 13, then by the appropriate control of the thyristors 14 through 19 of the bridge 10, the magnitude of the d.c. voltage appearing on buses 11 and 12 can be controlled. This control is normally achieved by what is commonly called "phase controlling" which amounts to the rendering conductive of the thyristors of the bridge at a variable point within the applied a.c. sine wave so as to vary the output voltage.

Figure 2:
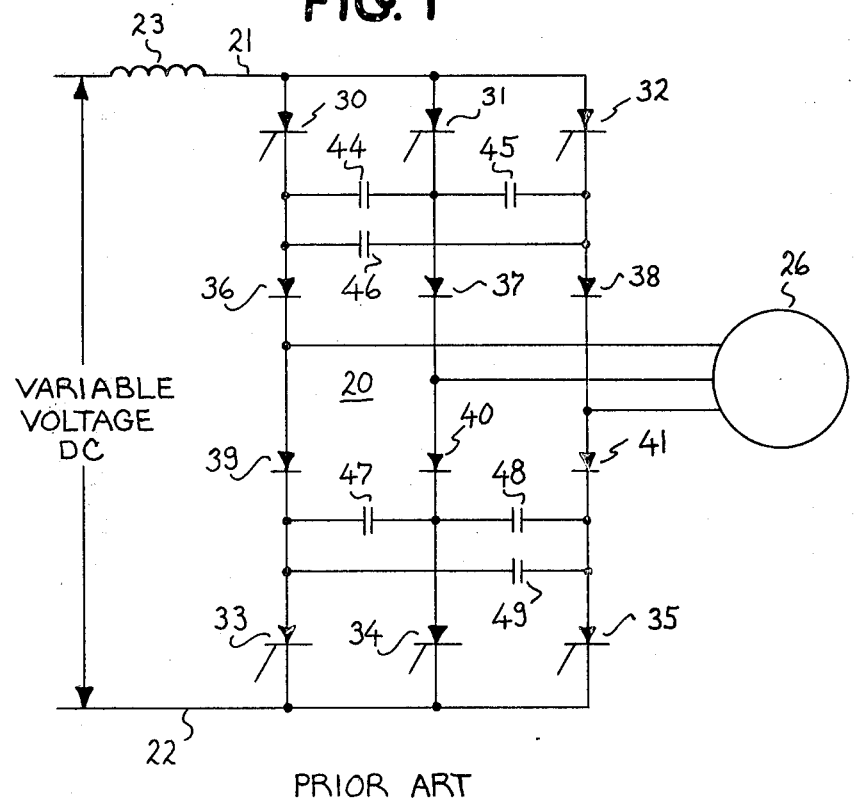
FIG. 2 is a schematic diagram illustrating the basic components of a controlled current inverter as is known in the art and as may be used in the implementation of the present invention; and, FIG. 3 is a schematic diagram partially in block form illustrating the present invention in its preferred embodiment.

FIG. 2 shows the basic form of a typical controlled current inverter for supplying a variable current, variable frequency power to a load. In FIG. 2, a variable d.c. voltage (and thus a variable d.c. current) is applied by way of buses 21 (including an inductor 23) and 22 to the inverter circuit shown generally at 20 which, in turn, supplies variable electrical power to a load 26 which, in the present illustration as is often the case, may be an a.c. induction motor. Inverter circuit 20 is comprised of, in the three phase embodiment illustrated, six thyristors 30 through 35 disposed in a basic bridge arrangement. Thyristors 30, 31 and 32 form the basic part of what is customarily considered to be the positive half of the bridge while thyristors 33, 34 and 35 form the basic portion of the negative side of the inverter bridge. The bridge illustrated in FIG. 2 has three legs with the first leg including thyristors 30 and 33 and further including a pair of series connected diodes 36 and 39. In a like manner, the second leg includes thyristors 31 and 34 and a pair of series connected diodes 37 and 40 while the third leg includes thyristors 32 and 35 and series connected diodes 38 and 41. Commutating capacitors are associated; i.e., connected, between each pair of diodes. That is, a first commutating capacitor 44 is connected between the cathodes of thyristors 30 and 31 while a capacitor 45 is connected between the cathodes of thyristors 31 and 32. The third commutating capacitor 46 in the positive portion of the inverter circuit is connected between the cathodes of thyristors 30 and 32. In a similar manner, commutating capacitors 47, 48 and 49 are connected between respective pairs of the anodes of thyristors 33, 34 and 35. The gating on (rendering conductive) of the thyristors 30 to 35 of the basic inverter circuit 20 is a function of gating signals, applied to the gate electrodes thereof by suitable leads, which carry signals derived from a gating control, not shown in FIG. 2.

Figure 3:
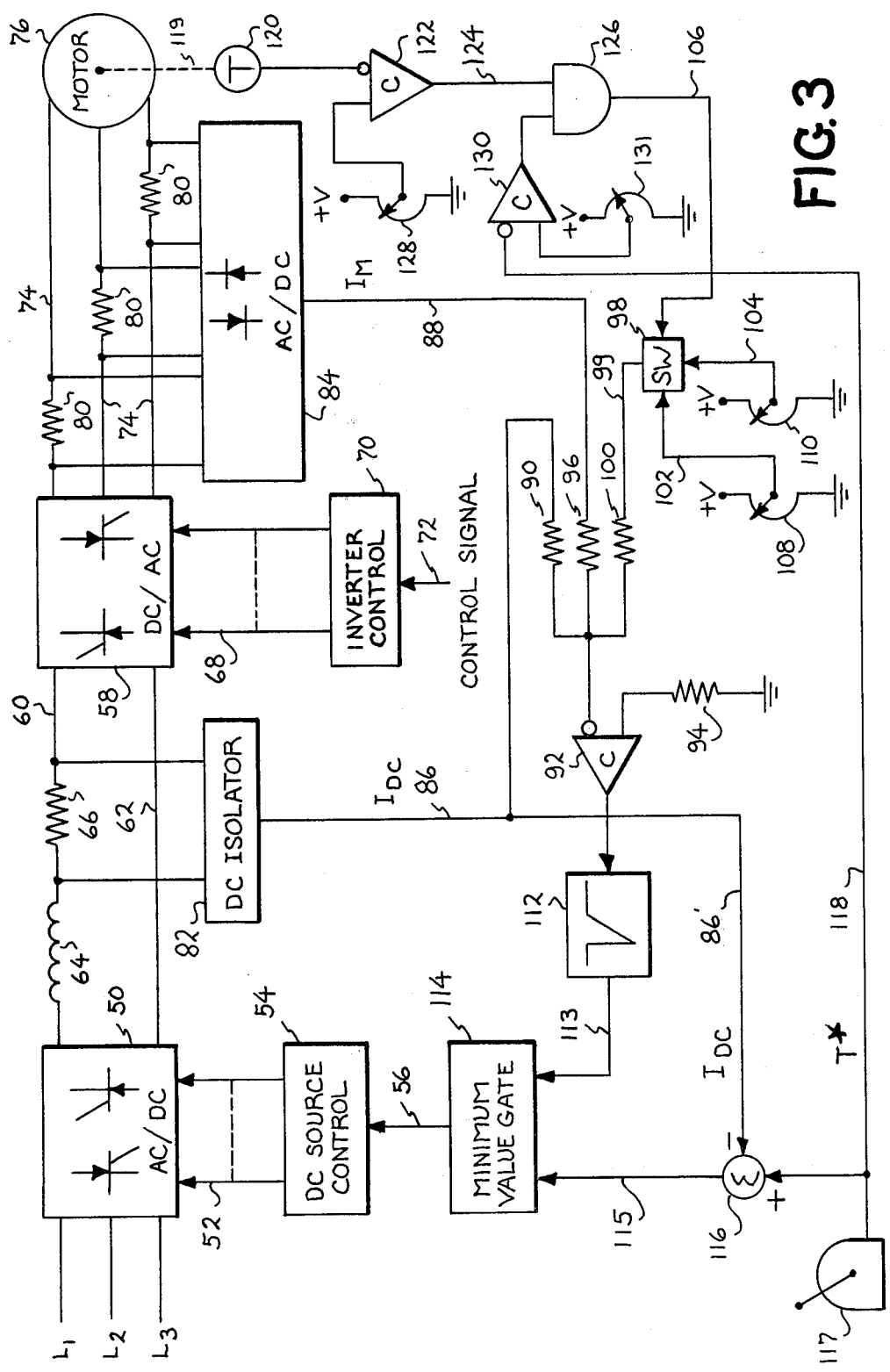

FIG. 3 illustrates the present invention in its preferred embodiment. Referencing now that figure, it is seen that there is provided a variable voltage d.c. source 50 which may be of the basic type as that described with respect to FIG. 1. As such, power to the variable d.c. source 50 is shown as being supplied from an a.c. source indicated by the lines $L_1$, $L_2$ and $L_3$. Control of the source 50 is by way of suitable input lines 52 from a d.c. source control 54. The nature of the source control 54 will, of course, depend upon the type of variable d.c. power source 50. In the event, for example, that the source 50 is of the type illustrated in FIG. 1, lines 52 represent gate leads and the d.c. source control 54 could be of the ramp and pedestal type to thus provide a variable output from the source 50 in accordance with the value of an input signal on line 56 to the control 54. (It is, of course, to be expressly understood that other forms of d.c. voltage sources could be used so long as they are responsive and variable to an input control signal.) The variable d.c. source 50 is connected to a three phase inverter circuit 58 by way of a d.c. link having conductors 60 and 62 and further including an inductor 64 and a low resistance shunt 66. The inverter 58 is preferably of the controlled current type such as was described with respect to FIG. 2 and is under the control of suitable control signals delivered by way of lines 68 which originate in an inverter control 70. Inverter control 70 receives a control command or signal by way of an input line 72. Assuming that inverter 58 is of the type earlier described, the signals on line 68 would serve to render conductive the thyristors of the inverter bridge to provide an output power, by way of lines 74, to a suitable load shown as a motor 76. The exact nature of the control 70 is not of prime importance of the present invention but, in a typical system, could include a ring counter which is supplied with pulses from a suitable source such as a voltage controlled oscillator which would receive, as an input, a voltage signal on line 72 which is indicative or proportional to the desired frequency of operation of the inverter 58. Low resistance shunts 80 are located in each of the lines 74 which supply electrical power to the load 76 for purposes to be explained.

In accordance with the present invention, there is provided a first current feedback signal, in FIG. 3 designated $I_{DC}$, which has as its origin with the shunt 66 located in the d.c. link. As was earlier stated, the shunt 66 is of a low value and will, therefore, develop a voltage across it proportional to the value of the current flowing in that d.c. link. This voltage is developed by way of any suitable d.c. isolator circuit 82 such that there appears, at the output of the isolator (line 86), the feedback signal $I_{DC}$ which is a signal having a value proportional to the current in the d.c. link.

The second feedback signal utilized in the system of the present invention is also a current feedback signal, designated $I_M$, which has a value proportional to the motor current. To this end, the three shunts 80 located in the lines 74 are provided such that there appears, across the three shunts, voltage signals proportional to the instantaneous currents existing within those lines. These signals are applied to a suitable three phase a.c. to d.c. rectifying isolator bridge circuit 84, the output of which is the $I_M$ signal (line 88).

Normal circuit theory would indicate that when the system supplying the motor was operating properly, the two signals, $I_{DC}$ and $I_M$, when appropriate compensation is made for various circuit losses, would be equal. This same theory would indicate that if a commutation fault or shoot-through were to occur in the inverter, the current $I_{DC}$ would tend to be shunted by the inverter, bypassing the motor. The $I_M$ signal would tend to fall off toward zero at a rate largely dependent upon the overall inductive reactance of the load circuit. Thus, the shoot-through can be detected by sensing the difference between $I_{DC}$ and $I_M$. It should be noted, however, that in many systems it is desired to keep a small current flowing in the motor at all times, even when the motor is not turning (idle condition), so as to maintain flux within the motor to assure a faster response time. If a shoot-through were to occur at idle, therefore, because $I_{DC}$ may be a very small value, a relatively small difference would exist between the $I_{DC}$ and $I_M$ current feedback signals.

A small difference between $I_{DC}$ and $I_M$ may not indicate a shoot-through since it has been found that when the inverter circuit is operated at higher frequencies, the difference between the two feedback signals $I_{DC}$ and $I_M$ increases. This is because the commutating capacitors within the controlled current inverter circuit begin to absorb a portion of the current $I_{DC}$ which then is not switched into the motor load. This is a phenomenon which becomes increasingly large as the operating frequency increases.

Thus, a shoot-through can be detected by sensing a difference between $I_{DC}$ and $I_M$, but the detection must be insensitive to small differences which occur at high frequency operation of the inverter. If, however, the desired operating current of the motor is very small, as might occur at standstill ("idle" operation) of the motors, then a shoot-through which occurs will cause $I_M$ to fall to zero, but the difference between $I_{DC}$ and $I_M$ may be very small. In order to detect a shoot-through in this case, the detector must be sensitive to very small differences in $I_{DC}$ and $I_M$. To accommodate both the high speed and low current idle conditions, the shoot-through detector must sense different levels of current difference in the two conditions.

Again referencing FIG. 3, the $I_{DC}$ signal appearing on line 86 forms one input, via an input resistor 90, to the inverting input of a suitable comparator operational amplifier 92 which has its non-inverting input connected to ground by way of a resistor 94. For purposes of this illustration it will be assumed that the $I_{DC}$ signal as it issues from the d.c. isolator 82 is a negative signal whose absolute magnitude varies directly proportional to the magnitude of the d.c. current as sensed by the shunt 66 as earlier explained. An equally viable method of sensing d.c. current, which is well known, is to develop the current signal from current transformers situated in lines $L_1$, $L_2$ and $L_3$. The second current feedback signal, that proportional to the motor current $I_M$, appears on line 88 as a positive signal and forms a second input to the inverting input of the comparator 92 by way of a suitable input resistor 96. As earlier indicated, the absolute magnitude value of the $I_M$ signal will, in normal operating conditions, be somewhat less than that of the signal $I_{DC}$ and the amount of differential is dependent upon the operating condition of the load or motor 76. When a shoot-through or commutation fault exists, this differential will be considerably larger. The reference signal earlier mentioned is derived from a suitable switching circuit 98 which outputs a positive signal which forms, via an input resistor 100, a third input to the comparator 92. Switch 98 may be of any suitable type to provide on its output a one of two input signals applied by lines 102 and 104 in accordance with the state of a third input or selection signal applied by way of line 106.

The derivation of the value of the signal on line 106 will be explained in detail subsequently but let it be assumed, for the present, that this signal is a binary type signal having a binary 1 value when the motor is at the idle condition and a binary 0 when the motor is in all other conditions of operation. The two reference signals are generated through the use of two reference potentiometers 108 and 110 which, respectively, supply the signals on line 102 and 104. Each of the potentiometers 108 and 110 is connected between a source of positive potential $+V$ and ground and its wiper arm forms the input for the respective two reference signals. The signal on line 102 represents the idle reference signal and when the signal on line 106 is a binary 1, switch 98 will serve to pass that signal via resistor 100 as the third input to the inverting input of the comparator 92. In a similar manner, if the signal on line 106 is a binary 0, indicating that the motor is not in the idle state, the signal from potentiometer 110 (line 104) is applied via switch 98 and resistor 100 to the inverting input of the comparator 92.

Continuing with the showing in FIG. 3, it is seen that the output of comparator 92 is applied as an input to a function generator 112 which, in the preferred embodiment, provides a negative saw-tooth wave output signal. That is, in response to a positive input from the comparator 92 the output of the generator 112 (line 113) will drop suddenly from its quiescent value and then begin to slowly ramp back to its quiescent value. The output of the function generator 112 is applied as one input to a minimum value gate 114 to which is also applied the normal control signal (line 115) for the variable voltage d.c. source. The minimum value gate 114 may be of any suitable form such as a pair of parallel connected diodes each receiving a one of the signals on lines 115 and 113 and having their anodes connected, by way of a resistor, to a positive potential such that the output of the minimum value gate 114 which appears on line 56 is the more negative or smaller of its two input signals. Since the d.c. source control 54 responds to the value of its input on line 56 and since the control 54 effects a lesser output voltage from the variable d.c. source 50 in response to a more negative signal, it is seen that by the proper scaling of the values of lines 113 and 115 when the output signal of the comparator 92 indicates a fault or shoot-through condition the minimum value gate 114 will turn control over to the signal from the function generator 112 (line 113) to thus reduce the voltage from the d.c. source 50 and hence reduce the current in the d.c. link to zero. The reduction of the d.c. link current to the inverter circuit 58 will cause a corresponding reduction in the inverter current to zero and allow the improperly conducting thyristor of the inverter circuit to cease to conduct.

The normal control signal on line 115 is the output signal of a summing junction 116 which receives as one input the negative $I_{DC}$ signal (line 86') to form a current feedback loop and as a second input a positive signal from a suitable operator control 117. The control 117 is set to achieve desired system performance and provides a signal T* proportional to desired output torque of the motor.

In explanation of the operation of the present invention thus far, let it be assumed that the motor is in the normal operating condition such that a negative $I_{DC}$ signal is present on line 86. A positive $I_M$ signal exists on line 88 and, because this is a normal operating condition, the high reference signal by way of potentiometer 110 and line 104 is delivered by switch to form the third input signal, via resistor 100 and line 99, to the comparator 92. Under these conditions, the sum of the two signals applied via lines 88 and 99, that is, $I_M$ plus the high reference signal, exceeds the negative value of the $I_{DC}$ signal on line 86 and the output of the comparator 92 is of a negative value such that the function generator 112 outputs its high level quiescent signal via line 113 to the minimum value gate 114. As such, the control of the variable d.c. source 50 is a function of the signal applied via line 115; i.e., the normal control signal. If now a shoot-through occurs, the motor current signal $I_M$ will drop to zero while the d.c. link current $I_{DC}$ will remain constant or rise in magnitude. These signals will result in the output of the comparator 92 switching from a 0 to a 1 value which will cause the function generator 112 to output the negative saw-tooth wave as earlier explained. This lower value signal (now lower than the signal on line 115) will be passed by the minimum value gate 114 and will appear on line 56. As such, the value of the d.c. link current $I_{DC}$ will decrease allowing the inverter to clear its fault and the system will return to normal operation. The only distinction between the normal operating condition just described and the idle condition is that by virtue of a binary 1 signal on line 106 the value of the reference signal provided by switch 98 is that from potentiometer 108 which is a lower value and hence a smaller differential between the two current feedback signals $I_{DC}$ and $I_M$ is necessary to effect the output change from comparator 92.

The sole remaining depiction of FIG. 3 to be explained is the generation of the selection signal on line 106 to indicate whether the motor is in the idle or the running state. The circuit actually employed to provide a signal indicative of motor state is shown and described in detail in U.S. patent application Ser. No. 032,855, "Zero Rotation And Zero Torque Detector and Method For An AC Motor Drive", by the invention of the present invention which application is assigned to the same assignee as this invention, was filed on even date herewith and which is incorporated hereinto by reference. The essence of that circuitry, however, so far as it is applicable to the present invention, is illustrated in FIG. 3 which shows a tachometer 120 which, as indicated by the dashed line 119, is connected to the motor load 76. Tachometer 120 will provide a positive output proportional to motor speed. This positive output is applied to the inverting input of a comparator 122 which provides, as a speed signal output on line 124, a binary 0 signal when the motor is rotating and a binary 1 signal when the motor is in its idle state. To provide a suitable reference point which can allow for very low angular velocities of the motor, there is provided to the noninverting input of the comparator 122 a signal derived from the wiper arm of a potentiometer 128 connected between a source of positive potential +V and ground. Thus, as earlier indicated, the output of the comparator 122 will indicate the rotational state of the motor. While it might first appear that the signal indicative of motor state could be used directly as the indicator to the switch 98, it must be remembered that this is purely a physical sensing and that the motor could be in a stalled condition which is also a zero speed state. A distinction between the two zero speed motor states can be made by recognizing that at idle there will be virtually no request for torque whereas if the motor is in the stalled condition, a relatively higher torque command will exist. Thus, there is provided an additional comparator 130 which receives as its inverting input, via line 118, the T* torque signal from control 117 and at its noninverting input a reference signal from a suitable reference source 131. Source 131 is shown as a potentiometer connected between a positive potential +V and ground. Since it was assumed in the earlier embodiments that the T* signal is positive, when the motor is at idle and there is a zero or very small T* signal, the output of comparator 130, a torque level signal, will be at a binary 1 level since the signal from the potentiometer 131 is larger than that of T*. The binary 1 signal from comparator 130 and the output of the comparator 122 (line 124) form inputs to an AND gate 126, the output of which is the signal on line 106. Since the output of comparator 122 is a binary 1 at idle condition and the same holds true for the binary output of comparator 130, it is seen that the signal on line 106 will be a binary 1 when the motor is in idle condition and will, in accordance with the previous description, effect the selection of the low reference signal from potentiometer 108 by way of switch 98. Conversely, when the motor is in the run condition, indicated by either a positive output signal from the tachometer 120 which results in binary 0 signal on line 124 or a binary 0 signal from comparator 130, a binary 0 will appear on line 106. This, in turn, causes the selection of the higher reference by the switching circuit 98.

Thus, it is seen that there has been provided a system for correction of commutation fault or shoot-through which, by recognition of the operational status of the load, varies the reference level for the normal comparison of the two current feedback signals and thus results in a much more effective and rapidly responding fault recognition without erroneously causing fault recovery conditions at lower load conditions.

While there has been shown and described what is at present considered to be the preferred embodiment of the present invention, modifications thereto will readily occur to those skilled in the art. For example, although a motor load has been shown, the present invention has general applicability to systems in which regardless of the load type there is a variation in operational load status. Obviously, if other types of loads were to be used, different forms of sensing of status might need to be employed. As a further example of possible modification, the torque signal (T*) used in the selection of the reference signals could be replaced, with proper scaling and safeguards, with the d.c. current signal ($I_{DC}$). That this substitution can be made is seen from the fact that at idle conditions $I_{DC}$ will be very small while at all other times, motor running and during shoot-through, this current will be of significant magnitude. It is not desired, therefore, that the invention be limited to the specific arrangement shown and described and it is intended to cover within the appended claims all such modifications as fall within the true spirit and scope of the invention.

What is claimed is:

1. An inverter system for supplying controlled, variable output voltage, current and frequency electrical power to a load comprising:
   (a) a source of variable direct current power for providing a d.c. output current;
   (b) control means for controlling the d.c. output current of said source;
   (c) an inverter circuit for receiving said d.c. output current and for providing an a.c. output current of variable frequency and voltage and current for application to said load;
   (d) a d.c. link circuit for carrying said d.c. output current from said source to said inverter circuit; and,
   (e) circuit means for detecting a commutation fault condition within said inverter circuit comprising, (1) means to produce a first feedback signal proportional to the magnitude of the d.c. current in said d.c. link circuit,
(2) means to produce a second feedback signal proportional to the magnitude of the a.c. output current of said inverter circuit.
(3) means to provide first and second reference signals of differing magnitudes,
(4) selection means responsive to an operational state of said load to select, for use, a one of said first and second reference signals,
(5) means responsive to a prescribed relationship of said first and second feedback signals and to the selected one of said reference signal to develop a correction signal, and,
(6) means for applying said correction signal to said control means to effect a reduction in the magnitude of the d.c. output current of said source.

2. The invention in accordance with claim 1 wherein said means to provide said reference signals includes a first reference source to provide said first reference signal of a first magnitude corresponding to a first operating condition of the load and a second reference source to provide said second reference of a higher magnitude than the first reference signal and corresponding to a second operating condition of the load.

3. The invention as defined in claim 1 in which the load is an alternating current motor and wherein said means to provide said reference signals includes a first reference source to provide said first reference signal having a magnitude slightly less than the value of said d.c. output current when said motor is at idle speed and a second reference source to provide said second reference signal having a magnitude substantially in excess of said first reference signal.

4. The invention in accordance with claim 1 wherein said last recited means includes:
(a) generator means for providing a control pulse of prescribed duration and shape; and,
(b) gating means for selectively applying said control pulse to said control means to thereby effect a reduction in the magnitude of the d.c. output current of said source of direct current power.

5. The invention in accordance with claim 4 wherein said generator means comprises a function generator to generate a substantially saw-tooth shaped control pulse.

6. The invention in accordance with claim 1 wherein said inverter circuit is a polyphase controlled current inverter circuit including controlled rectifiers and commutation capacitors connected between selected pairs of said rectifiers.

7. The invention in accordance with claim 3 in which said selection means comprises:
(a) means to provide a speed signal having a first state representing a minimum angular velocity of the motor and a second state representing a motor angular velocity of less than said minimum;
(b) means to provide a torque level signal having a first state representing a demand for motor torque of a very small value and a second state representing a demand for motor torque of a higher value; and,
(c) means including switch means for selecting, for use, a one of said first and second reference signals in accordance with the instantaneous states of said speed and torque level signals.

8. A commutation detection and correction system for use with a polyphase alternating current motor drive system in which an alternating current motor is supplied with variable frequency alternating current from a controlled current inverter circuit which receives direct current power from a variable direct current source by way of a direct current link circuit, comprising:
(a) means associated with said direct current link to provide first feedback signal as a function of the current in said link;
(b) means to develop a second feedback signal as a function of said variable frequency alternating current;
(c) means to develop a selection signal as a function of the operational status of said motor, said selection signal having a first state when said motor is in an idle status and a second state when said motor is in a run status;
(d) means to provide first and second reference signals, said first reference signal having a value slightly less than the value of the direct current in said link when said motor is in its idle status, said second reference signal having a value distinguishably higher than that of said first reference signal;
(e) means to select a one of said reference signals as a function of the state of said selection signal; and,
(f) means responsive to a prescribed relationship between said first and second feedback signals and the selected one of said reference signals to effect a reduction in the direct current in said link circuit.

9. The invention in accordance with claim 8 further including control means for controlling the magnitude of the direct current in said link circuit and wherein said last recited means includes:
(a) generator means for providing a control pulse of prescribed duration and shape, and,
(b) gating means for selectively gating said control pulse to said control means to thereby effect a reduction in the magnitude of the direct current in said link circuit.

10. The invention in accordance with claim 9 wherein said generator means comprises a function generator to generate a substantially saw-tooth shaped control pulse.

11. A method of supplying electrical power to a load, said electrical power being variable in voltage, current and frequency comprising the steps:
(a) developing a variable direct current as a function of a controllable input signal;
(b) delivering said direct current by way of a direct current link circuit to an inverter circuit;
(c) operating said inverter circuit in a variable output mode in response to an input control signal to provide variable frequency voltage and current power for delivery to said load;
(d) detecting and correcting for commutation faults occurring within said inverter circuit by means of the steps of,
(1) producing a first feedback signal proportional to the magnitude of the direct current supplied to the inverter circuit,
(2) producing a second feedback signal proportional to the magnitude of the output current of the inverter circuit,
(3) providing first and second reference signals of differing magnitudes,
(4) sensing the operational state of said load to produce a selection signal, (5) selecting a one of the first and second reference signals, in accordance with the instantaneous state of the selection signal, (6) combining said first feedback, said second feedback signal and the selected one of said reference signals to produce an output signal in response to a prescribed relationship existing therebetween, and, (7) reducing said direct current signal as a function of the existence of the said correction signal.

12. For use in a polyphase alternating current motor drive system in which an alternating current motor is supplied with variable frequency alternating current from a controlled current inverter which receives direct current power from a variable direct current source by way of a direct current link circuit, the method of detecting and correcting for commutation faults existing within said inverter comprising the steps of:

(a) developing a first feedback signal as a function of the current in said direct current link;

(b) developing a second feedback signal as a function of the output current of said inverter;

(c) developing a selection signal as a function of the operational status of said motor;

(d) developing first and second reference signals having substantially different magnitudes;

(e) selecting a one of said reference signals as a function of the status of said selection signal;

(f) combining said first and second feedback signals and the selected one of said reference signals to produce a correction signal; and, (g) reducing the value of the direct current flowing within said link in response to the occurrence of said correction signal.

13. The method in accordance with claim 12 wherein the step of developing the selection signal comprises the steps:

(a) sensing the angular velocity of said motor and providing a speed signal having a first state when said velocity is less than a predetermined value and a second state when said velocity exceeds the predetermined value;

(b) providing a torque signal proportional to a desired level of motor output torque;

(c) comparing said torque signal with a reference value to output a torque level signal having a first state representing a demand of a very small value and a second state representing a demand for motor torque of a higher value; and, (d) combining said speed and torque level signals to develop said selection signal, said selection signal having a first state when said speed and torque level signals are in their first state and a second state at all other times.

14. The method in accordance with claim 12 wherein the step of developing said first and second reference signals comprises the steps:

(a) developing said first reference signal having a value slightly less than the value of the current in said direct current link when that link current is at its minimum value; and, (b) developing said second reference signal having a value higher than said first reference signal.

* * * * *